June 10, 1947.  N. FLESCH  2,422,004
BRAKE
Filed May 15, 1944  3 Sheets-Sheet 2

INVENTOR.
Norman Flesch
BY
Atty.

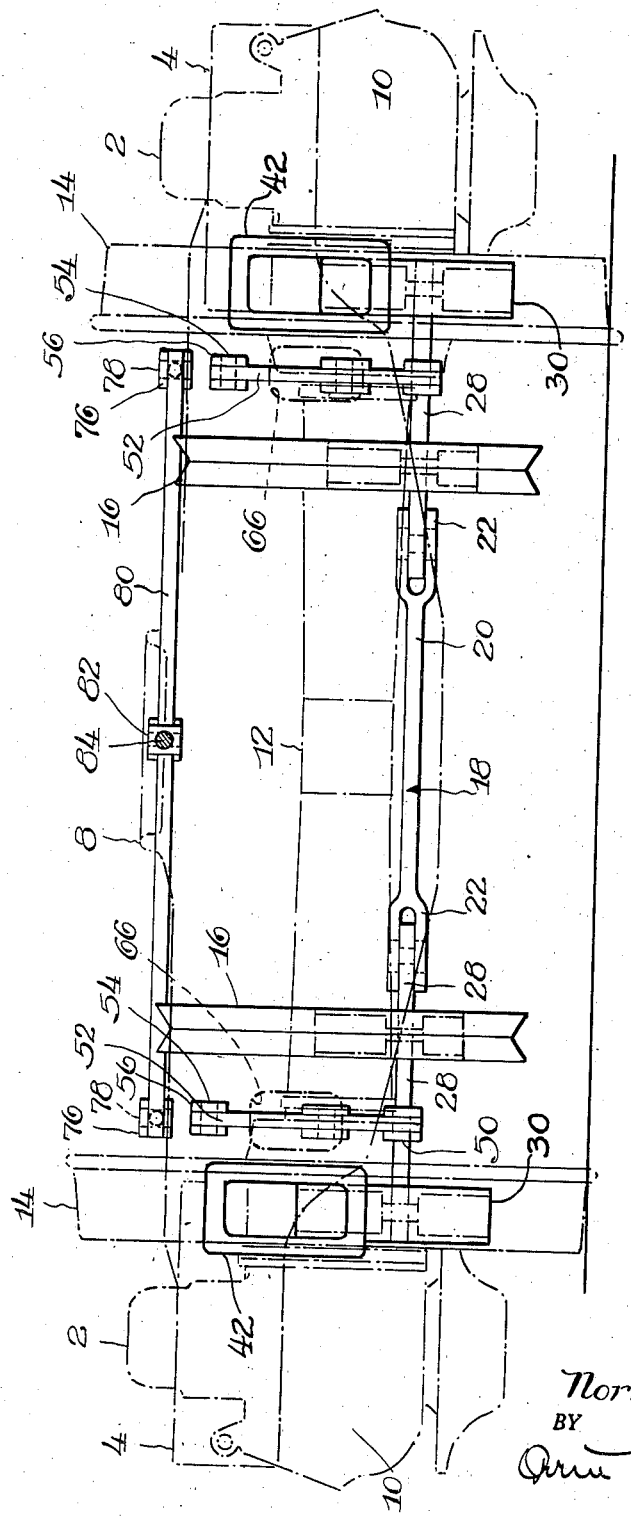

Patented June 10, 1947

2,422,004

UNITED STATES PATENT OFFICE 2,422,004

BRAKE

Norman Flesch, Chicago, Ill., assignor to American Steel Foundries, Chicago, Ill., a corporation of New Jersey Application May 15, 1944, Serial No. 535,584

25 Claims. (Cl. 188—52)

My invention relates to brakes and more particularly to a brake rigging for a railway car truck.

The general object of my invention is to design a so-called "Duplex" arrangement in which brake means is provided for each wheel, as well as an adjacent brake drum rotatable therewith.

In my novel arrangement, a brake beam member is supported from the truck frame adjacent each wheel carrying friction means for engagement therewith and other friction means for engagement with the adjacent drum; and the inboard ends of the corresponding brake beam members at opposite ends of the truck are afforded articulated or pivotal connections to rigid means extending therebetween. In this manner, a segmental brake beam is provided which is afforded a two-point support from the truck and is capable of accommodating various conditions of wear in the friction means mounted on the beam.

A different object of my invention is to design a novel single shoe brake rigging comprising brake beams intermediate the wheel and axle assemblies and novel actuating means at each side of the truck for said beams, said actuating means comprising interconnected live and dead levers and a compression member in the form of a rod connected therebetween and extending through an opening in the truck bolster.

In the drawings,

Figure 3 is an end view taken from the right as seen in Figures 1 and 2.

Figure 1:
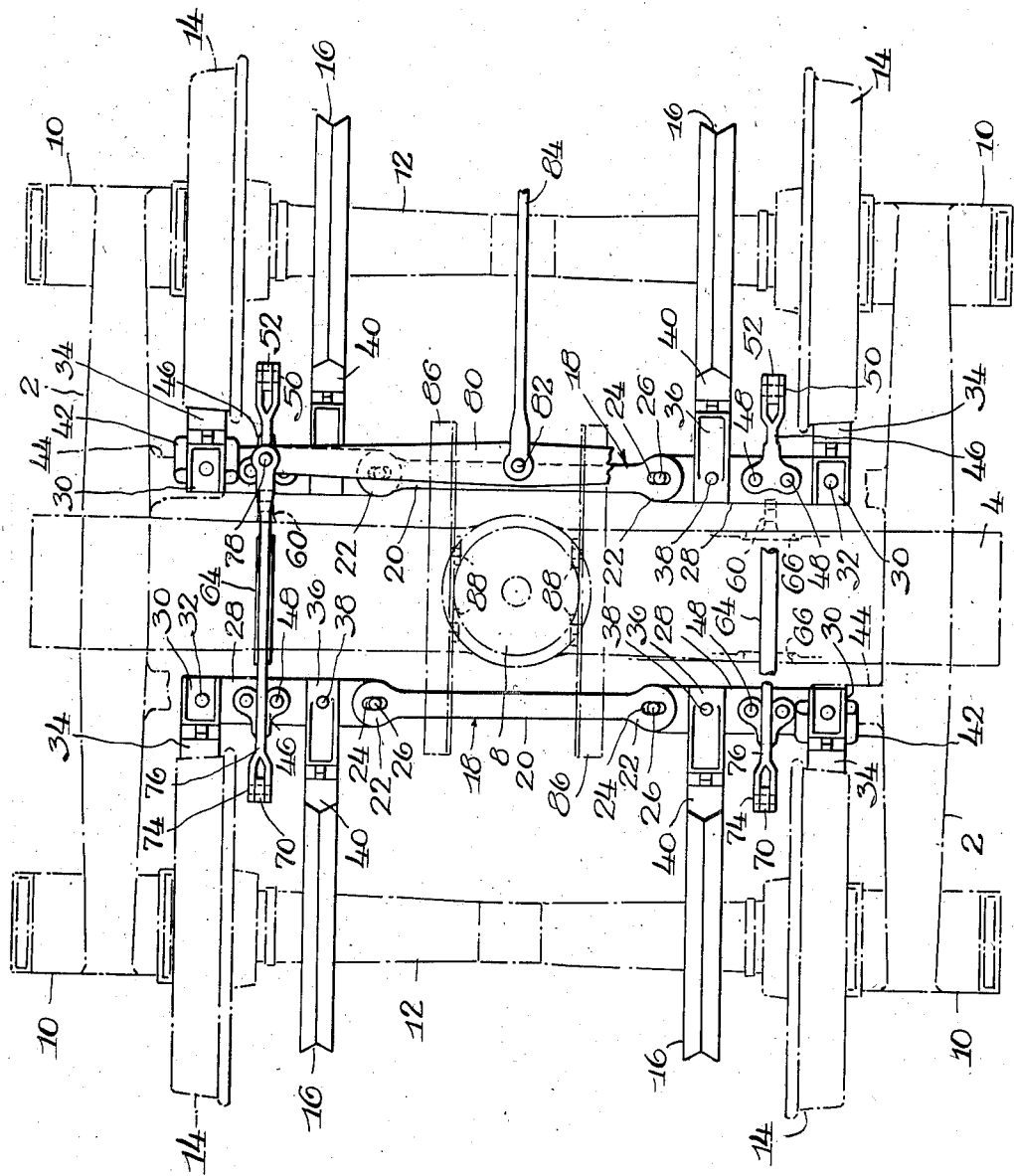
Figure 1 is a top plan view of a freight car truck embodying my invention, portions of the structure being broken away to clarify the illustration.

In each of said figures, certain details may be omitted where more clearly seen in other views.

My invention is herein illustrated as applied to a more or less conventional freight car truck comprising a truck frame including spaced side frames 2, 2 and a bolster 4 extending therebetween, said bolster extending at each end thereof into a bolster opening 6 (Figure 2) in the associated side frame for support therewithin in conventional manner by springs (not shown).

The bolster is formed with a center bearing 8 formed and arranged for the support of an associated car body (not shown), as will be clearly understood by those skilled in the art.

At opposite ends thereof the side frames 2, 2 are provided with journal boxes 10, 10 for the accommodation in the usual manner of the journal ends of the spaced wheel and axle assemblies 12, 12, each of which comprises spaced wheels 14, 14 and inboard drums or discs 16, 16 mounted adjacent thereto for rotation therewith. A pair of brake beams generally designated 18, 18 are supported between the wheel and axle assemblies as hereinafter described, each of said beams comprising a central member 20 having jaw ends 22, 22 at opposite extremities thereof with elongated slots 24, 24 (Figure 1) for the reception of pivot means 26, 26 connecting the member 20 to end members 28, 28. An outboard brake head 30 is pivotally connected as at 32 to each end member 28 of the brake beam, said head carrying a brake shoe 34 for frictional engagement with the tread surface of the associated wheel 14; and each end member 28 of the brake beam supports a brake head 36 pivotally connected thereto as at 38 and carrying a brake shoe 40 for frictional engagement with the perimeter of the adjacent drum 16.

It will be understood that while the engaging surfaces of the drums 16, 16 and the shoes 40, 40 are herein illustrated as V-shaped for the purpose of maintaining alignment between the drums and the shoes 40, 40, it will be understood that these surfaces may be of any desired contour.

Each brake head 30 is pivotally supported by means of a conventional brake hanger 42 from a brake hanger bracket 44 formed on the inboard side of the adjacent side frame 2. It will be understood that by means of the arrangement above described, the brake beams 18, 18 are afforded suspension by the hangers 42, 42 while, at the same time, the segmental construction of the beams is such that they may automatically adjust to accommodate uneven wear conditions in the various shoes 34 and 40. Thus, if the shoes at one end of the beam are substantially new, and the shoes at the opposite end of the beam are considerably worn, the segments 20 and 28 of the beam will automatically pivot about the pivot points 26, 26 to accommodate this condition.

Figure 2:
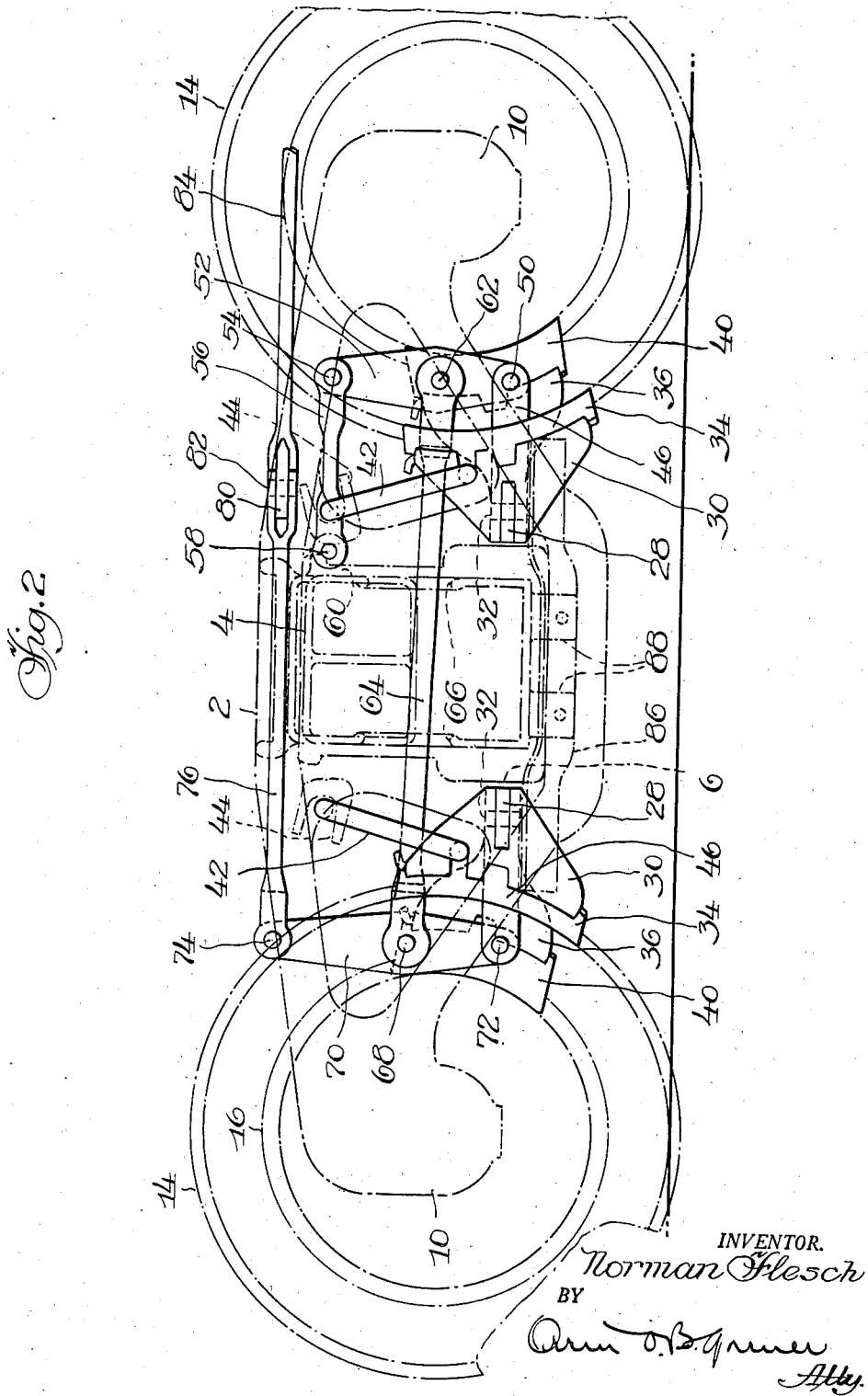
Figure 2 is a side elevation of the structure shown in Figure 1.

Each member 28 is provided with a fulcrum jaw 46 secured thereto in any convenient manner as by rivets 48, 48, the jaw 46 associated with the beam at the right, as shown in Figures 1 and 2, being pivotally connected at 50 to the lower end of a dead truck lever 52, the upper end of which is pivotally connected at 54 to a link or pull rod 56 which is pivotally connected at 58 to a bracket 60 formed on the adjacent side of the bolster 4. Intermediate its ends, the lever 52 is pivotally connected at 62 to a compression rod 64 which extends through openings 66, 66 in the bolster for pivotal connection at 68 to the live truck lever 70 intermediate the ends thereof. The lower extremity of the live lever 70 is pivotally connected at 72 to the fulcrum 46 of the beam 18, shown at the left in Figures 1 and 2.

The upper extremity of the live lever 70 is pivotally connected at 74 to a pull rod 76 which is pivotally connected at 78 to one end of an equalizer 80 extending transversely of the truck, each end of the equalizer 80 being connected to the pull rod 76 at one side of the truck. Intermediate its ends the equalizer 80 is pivotally connected at 82 to a pull rod 84 for connection to associated body brake actuating means (not shown).

Safety brackets 86, 86 are secured to lugs 88, 88 depending from the bolster, said brackets 86 being in the form of elongated bars or beams underlying the central members 20, 20 of the brake beams 18, 18 to afford a safety support therefor in the event that some portion thereof should fail under service conditions.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake arrangement for a railway car truck comprising a truck frame and a pair of spaced supporting wheel and axle assemblies, the combination of a pair of brake beams intermediate said assemblies and extending transversely of the truck, each of said beams comprising a central portion and spaced end portions having articulated connections thereto, each of said end portions carrying spaced brake shoes for engagement respectively with a wheel and an inboard brake drum of the adjacent assembly, and actuating means operatively associated with said beams for urging the latter toward respective assemblies, said actuating means comprising a pair of interconnected live and dead levers at each side of the truck connected respectively to the adjacent end portions of respective beams, and operating means associated with the live levers at opposite sides of the truck, said operating means comprising an equalizer operatively connected to said live levers, and a pull rod connected to said equalizer.

2. In a brake arrangement for a railway car truck comprising a truck frame and a pair of spaced supporting wheel and axle assemblies each comprising spaced wheels, the combination of a pair of brake beams intermediate said assemblies and extending transversely of the truck, each of said beams comprising a central portion and spaced end portions having articulated connections therewith, each of said end portions carrying a brake shoe for engagement with the adjacent wheel, and actuating means operatively associated with said beams, said actuating means comprising a pair of interconnected live and dead truck levers at each side of the truck connected to the adjacent end portions of respective beams, and operating means associated with the live levers at opposite sides of the truck, said operating means comprising an equalizer connected to said live levers and a pull rod connected to said equalizer.

3. In a brake arrangement for a railway car truck comprising a truck frame and a pair of spaced supporting wheel and axle assemblies each comprising an axle and spaced wheels mounted thereon, the combination of a pair of brake beams intermediate said assemblies and extending transversely of the truck, each of said beams comprising a plurality of segments pivotally interconnected on vertical axes, the segment at each end of the beam being supported from said frame and carrying brake shoes for engagement respectively with the wheels of the adjacent assembly, and actuating means operatively associated with said beams for urging the latter toward respective assemblies, said actuating means comprising a pair of interconnected live and dead truck levers at each side of the truck connected to the adjacent segments at opposite ends of respective beams, and operating means associated with the live levers at opposite sides of the truck, said operating means comprising an equalizer connected to said live levers and a pull rod connected to said equalizer.

4. In a brake arrangement for a railway car truck comprising a truck frame and a pair of spaced supporting wheel and axle assemblies, the combination of a pair of brake beams intermediate said assemblies and extending transversely of the truck, each of said beams comprising a central portion and spaced end portions having articulated connections thereto, each of said end portions carrying spaced brake shoes for engagement respectively with a wheel and an inboard brake drum of the adjacent assembly, and actuating means operatively associated with said beams for urging the latter toward respective assemblies, said actuating means comprising a pair of interconnected levers at each side of the truck connected respectively to the adjacent end portions of respective beams, one of said levers being a dead lever, and operating means for the other of said levers.

5. In a brake arrangement for a railway car truck comprising a truck frame and a pair of spaced supporting wheel and axle assemblies, the combination of a pair of brake beams intermediate said assemblies and extending transversely of the truck, each of said beams comprising at each extremity thereof an end portion carrying spaced brake shoes for engagement with a wheel and an inboard brake drum of the adjacent assembly, and actuating means operatively associated with said beams, said actuating means comprising a pair of interconnected live and dead levers at each side of the truck connected to the adjacent end portions of respective beams, and operating means associated with the live levers at opposite sides of the truck, said operating means comprising an equalizer operatively connected to said live levers and a pull rod connected to said equalizer.

6. In a brake arrangement for a railway car truck comprising spaced wheel and axle assemblies and a truck frame supported therefrom, said frame including spaced side frames and an intervening bolster, the combination of brake beams intermediate said assemblies and extending transversely of the truck, and actuating means at each side of the truck operatively associated with said beams, each of said actuating means comprising live and dead truck levers connected to respective beams, a compression rod extending between said levers and pivotally connected thereto, and operating means for said live lever, each of said beams comprising a plurality of rigid segments pivotally interconnected on vertical axes, the segment at each end of the beam being supported from the adjacent side frame and carrying friction means for engagement with axially spaced friction surfaces of the adjacent assembly.

7. In a brake arrangement for a railway car truck comprising spaced wheel and axle assemblies supporting a truck frame including spaced side frames and an intervening bolster, the combination of brake beams disposed intermediate said assemblies and extending transversely of the truck, said beams being supported from said side frames and each beam comprising a central portion and spaced end portions pivotally connected thereto, and actuating means at each side of the truck operatively associated with said beams, said actuating means comprising live and dead truck levers connected to respective beams, a compression rod extending between said levers and pivotally connected thereto, and operating means for said live lever, each of said end portions including friction means engageable with axially spaced friction surfaces on the associated assembly adjacent each end thereof.

8. In a brake arrangement for a railway car truck comprising spaced wheel and axle assemblies supporting a truck frame including spaced side frames and an intervening bolster, the combination of brake beams disposed intermediate said assemblies and extending transversely of the truck, said beams being supported from said side frames and each beam comprising a plurality of segments pivotally interconnected on vertical axes, the segment at each end of the beam being supported from said frame, and actuating means at each side of the truck operatively associated with said beams, said actuating means comprising live and dead truck levers connected to segments at opposite ends of respective beams, a compression rod pivotally connected between said levers and extending through an opening in said bolster, and operating means for the live levers at opposite sides of the truck, said operating means including an equalizer pivotally connected to said live levers and a pull rod connected to said equalizer.

9. In a brake arrangement for a railway car truck comprising a truck frame and a pair of spaced supporting wheel and axle assemblies, the combination of a pair of brake beams intermediate said assemblies and extending transversely of the truck, each of said beams comprising at each extremity thereof an end portion carrying spaced brake shoes for engagement respectively with a wheel and an inboard brake drum of the adjacent assembly, and actuating means operatively associated with said beams, said actuating means comprising a pair of interconnected levers at each side of the truck connected to the adjacent end portions of respective beams, one of said levers being a dead lever, and operating means for the other of said levers.

10. In a brake arrangement for a railway car truck comprising a truck frame and a pair of spaced supporting wheel and axle assemblies each comprising spaced wheels, the combination of a pair of brake beams intermediate said assemblies and extending transversely of the truck, each of said beams comprising a central portion and spaced end portions having articulated connections therewith, each of said end portions carrying a brake shoe for engagement with the adjacent wheel, and actuating means operatively associated with said beams, said actuating means comprising a pair of interconnected live and dead truck levers at each side of the truck connected to the adjacent end portions of respective beams, and operating means for said live lever.

11. In a brake arrangement for a railway car truck comprising a truck frame and a pair of spaced supporting wheel and axle assemblies each comprising an axle and spaced wheels and brake drums mounted thereon, the combination of a pair of brake beams intermediate said assemblies and extending transversely of the truck, each of said beams comprising end portions carrying brake shoes for engagement respectively with the wheels and brake drums of the adjacent assembly, and actuating means operatively associated with said beams for urging the latter toward respective assemblies, said actuating means comprising a pair of interconnected live and dead truck levers at each side of the truck connected to the adjacent end portions of respective beams, and operating means for said live lever.

12. In a brake arrangement for a railway car truck comprising spaced wheel and axle assemblies and a truck frame supported therefrom, each of said assemblies comprising spaced wheels and a brake drum adjacent each wheel, the combination of brake beam members at each side of the truck supported at their outboard ends from said frame between said assemblies, each of said members carrying brake shoe means engageable with the adjacent wheel and other brake shoe means engageable with the adjacent drum, actuating means associated with said members, and means pivotally connected on vertical axes to the inboard ends of corresponding members at opposite sides of the truck, said last-mentioned means being vertically rigid.

13. In a brake arrangement for a railway car truck comprising spaced wheel and axle assemblies and a truck frame supported therefrom, each of said assemblies comprising spaced wheels and a brake drum adjacent each wheel, the combination of brake beam members at each side of the truck adjacent respective assemblies, said members being supported at their outboard ends from said frame, and each of said members carrying friction means engageable with the adjacent wheel and the adjacent drum, actuating means associated with said members, and rigid members extending transversely of the truck and each pivotally connected on vertical axes to the inboard ends of corresponding brake beam members at opposite sides of the truck.

14. In a brake arrangement for a railway car truck comprising a truck frame and a supporting wheel and axle assembly including an axle, spaced wheels mounted thereon and brake drums carried by said axle inboard respective wheels, the combination of a segmental brake beam supported adjacent said assembly and extending transversely of said truck, said beam comprising a plurality of members pivotally interconnected on vertical axes, the member at each end of said beam being supported from said truck frame and being disposed adjacent one wheel and having directly mounted thereon brake means for engagement with said wheel and with the adjacent drum, and actuating means for urging said member toward said assembly.

15. In a brake arrangement for a railway car truck comprising a truck frame and a supporting wheel and axle assembly including an axle, spaced wheels mounted thereon and brake drums carried by said axle inboard respective wheels, the combination of a segmental brake beam supported adjacent said assembly and extending transversely of said truck, said beam comprising a plurality of members pivotally interconnected on vertical axes, the member at each end of said beam being supported from said truck frame and being disposed adjacent one brake drum and lying in a horizontal plane between the top and bottom of said drum, said member having directly mounted thereon brake means for engagement with the drum, and actuating means for urging said member toward said assembly.

16. In a brake arrangement for a railway car truck comprising a truck frame and a pair of spaced supporting wheel and axle assemblies, the combination of a pair of brake beams intermediate said assemblies and extending transversely of the truck, each of said beams comprising a central portion and an end portion at each end thereof having articulated connections thereto, each of said end portions carrying spaced brake shoes for engagement respectively with a wheel and an inboard brake drum of the adjacent assembly, and actuating means connecting said beams and operatively associated therewith for urging the beams toward respective assemblies.

17. In a brake arrangement for a railway car truck comprising spaced wheel and axle assemblies supporting a truck frame including spaced side frames and an intervening bolster, the combination of brake beams disposed intermediate said assemblies and extending transversely of the truck, said beams being supported from said side frames and each beam comprising a central portion and spaced end portions pivotally connected thereto, and actuating means at each side of the truck connecting said beams and operatively associated therewith, said actuating means comprising live and dead truck levers connected to respective beams, a compression rod extending between said levers and pivotally connected thereto, and operating means for said live lever.

18. In a brake arrangement for a railway car truck comprising a truck frame and a pair of spaced supporting wheel and axle assemblies each comprising spaced wheels, the combination of a pair of brake beams intermediate said assemblies and extending transversely of the truck, each of said beams comprising a central portion and an end portion at each end thereof having articulated connections therewith, each of said end portions carrying a brake shoe for engagement with the adjacent wheel, and actuating means operatively associated with said end portions and connecting said beams.

19. In a brake arrangement for a railway car truck comprising a truck frame and a pair of spaced supporting wheel and axle assemblies, the combination of a pair of brake beams intermediate said assemblies and extending transversely of the truck, each of said beams comprising at each extremity thereof an end portion carrying spaced brake shoes for engagement respectively with a wheel and an inboard brake drum of the adjacent assembly, and actuating means connecting and operatively associated with said beams.

20. In a brake arrangement for a railway car truck comprising a truck frame and a supporting wheel and axle assembly including an axle, spaced wheels and brake drums mounted thereon, the combination of brake beam members at each side of the truck adjacent said assembly, said members being supported at their outboard ends from said frame and each of said members directly carrying friction means engageable with the adjacent wheel and drum, actuating means at each side of the truck associated with said members, and a rigid member extending transversely of the truck and pivotally connected on vertical axes to the inboard ends of corresponding brake beam members at opposite sides of the truck.

21. In a brake arrangement for a railway car truck comprising a truck frame and a supporting wheel and axle assembly including an axle, spaced wheels mounted thereon, and brake drums carried by said axle inboard respective wheels, the combination of break beam members at each side of the truck adjacent said assembly, said members being supported at their outboard ends from said frame, and each of said members directly carrying friction means engageable with the adjacent drum, actuating means at each side of the truck associated with said members, and a rigid member extending transversely of the truck and pivotally connected on vertical axes to the inboard end of corresponding brake beam members at opposite sides of the truck.

22. In a brake arrangement for a railway car truck comprising spaced wheel and axle assemblies supporting a truck frame, the combination of brake beams disposed intermediate said assemblies, each of said beams comprising a plurality of rigid segments pivotally interconnected on vertical axes, the segment at each end of the beam being supported from said frame and having directly mounted thereon friction means for engagement with axially spaced friction surfaces of the adjacent assembly, and actuating means operatively associated with said beams for urging the latter toward respective assemblies.

23. A brake arrangement for a railway car truck comprising spaced wheel and axle assemblies supporting a truck frame, each of said assemblies comprising spaced wheels and a brake drum adjacent each wheel, the combination of brake beams disposed intermediate said assemblies, each of said beams comprising a plurality of rigid segments pivotally interconnected on vertical axes, the segment at each end of the beam being supported from said frame and directly carrying friction means for engagement with the adjacent wheel and the adjacent drum, and actuating means operatively associated with said last-named segments for urging the latter toward respective assemblies.

24. In a brake arrangement for a railway car truck comprising spaced wheel and axle assemblies supporting a truck frame, the combination of brake beams disposed intermediate said assemblies, each of said beams comprising a plurality of rigid segments extending transversely of the truck and pivotally interconnected on vertical axes, the segment at each end of the beam being supported from said frame and directly carrying friction means for engagement with the adjacent wheel, and actuating means at each side of the frame operatively associated with said last-named segments for urging the latter toward respective assemblies.

25. In a brake arrangement for a railway car truck comprising spaced wheel and axle assemblies supporting a truck frame, each of said assemblies comprising spaced wheels and a brake drum adjacent each wheel, the combination of brake beams disposed intermediate said assemblies and extending transversely of the truck, each of said beams comprising a plurality of rigid segments pivotally interconnected on vertical axes, the segment at each end of the beam being supported from said frame and directly carrying friction means for engagement with the adjacent drum, and actuating means at each side of said frame operatively associated with said last-named segments for urging the latter toward respective assemblies.

NORMAN FLESCH.

REFERENCES CITED

The following references are of record in the file of this patent:

UNITED STATES PATENTS

| Number | Name | Date |
|---|---|---|
| 2,065,200 | Shafer | Dec. 22, 1936 |
| 1,929,767 | Baselt | Oct. 10, 1933 |
| 2,243,534 | Mussey | May 27, 1941 |
| 1,901,019 | Blunt | Mar. 14, 1933 |
| 309,548 | Jewett | Dec. 23, 1884 |
| 960,355 | Levin | June 7, 1910 |
| 1,159,113 | Smith | Nov. 2, 1915 |
| 2,155,222 | Farmer | Apr. 18, 1939 |
| 1,726,015 | Coseo | Aug. 27, 1929 |